(12) United States Patent
Markus et al.

(10) Patent No.: US 7,948,975 B2
(45) Date of Patent: May 24, 2011

(54) TRANSPARENT SWITCHING FABRIC FOR MULTI-GIGABIT TRANSPORT

(75) Inventors: Ruben Gabriel Markus, Petach Tikva (IL); Israel Vitelson, Givatayim (IL); Joseph Moshe, Herzliya (IL)

(73) Assignee: IPLight Ltd., Petach Tikva (IL)

( * ) Notice: Subject to any disclaimer, the term of this patent is extended or adjusted under 35 U.S.C. 154(b) by 159 days.

(21) Appl. No.: 12/395,720

(22) Filed: Mar. 2, 2009

(65) Prior Publication Data
US 2009/0220229 A1    Sep. 3, 2009

Related U.S. Application Data

(60) Provisional application No. 61/068,117, filed on Mar. 3, 2008.

(51) Int. Cl.
*H04L 12/50* (2006.01)
*H04Q 11/00* (2006.01)
(52) U.S. Cl. .................... 370/366; 370/367; 398/50
(58) Field of Classification Search .......... 370/366–367; 398/50
See application file for complete search history.

(56) References Cited

U.S. PATENT DOCUMENTS

| | | | | |
|---|---|---|---|---|
| 3,781,818 A * | 12/1973 | Pardoe et al. | ................. | 370/538 |
| 4,628,493 A * | 12/1986 | Nelson et al. | .................. | 367/79 |
| 5,121,381 A * | 6/1992 | Takahashi et al. | ............. | 398/56 |
| 5,818,366 A * | 10/1998 | Morley | ......................... | 341/101 |
| 6,424,649 B1 * | 7/2002 | Laor et al. | ..................... | 370/359 |
| 6,704,307 B1 * | 3/2004 | Graves et al. | ................. | 370/372 |
| 6,747,988 B1 * | 6/2004 | Jordan et al. | .................. | 370/466 |
| 7,106,227 B2 * | 9/2006 | Karlquist | ....................... | 341/101 |
| 7,286,487 B2 * | 10/2007 | Perkins et al. | ................. | 370/253 |
| 7,317,775 B1 * | 1/2008 | Erhart et al. | ................. | 375/355 |
| 7,653,083 B2 * | 1/2010 | Liu et al. | ....................... | 370/466 |
| 7,664,139 B2 * | 2/2010 | Loprieno et al. | ............. | 370/472 |

(Continued)

OTHER PUBLICATIONS

ITU-T, "Interfaces for the Optical Transport Network: Series G and Series Y", Recommendation G709/Y.1331, International Telecommunication Union, Mar. 2003.

Study Group 15, TD24R1 (PLEN/15), "Interfaces for the Optical Transport Network: Amendment 3", Recommendation G709/Y.1331, International Telecommunication Union, Geneva, Switzerland, Dec. 1-12, 2008.

*Primary Examiner* — Aung S Moe
*Assistant Examiner* — Benjamin Elliott
(74) *Attorney, Agent, or Firm* — D. Kligler I.P. Services Ltd.

(57) ABSTRACT

A communication apparatus includes at least one input port, multiple output ports, at least one Serial-to-Parallel (S/P) converter and at least one Parallel-to-Serial (P/S) converter. The S/P converter is operative to receive from the input port an input data stream that is to be cross-connected to a destination output port, and to separate the input data stream into multiple sub-streams. Each of the switching planes includes at least one input for receiving a respective sub-stream from the S/P converter; multiple outputs, each output associated with a respective one of the output ports; and switching circuitry, which is configured to switch the respective sub-stream to the output that is associated with the destination output port. The P/S converter is coupled to the outputs of the switching planes so as to combine the multiple sub-streams switched by the switching circuitry into a combined output data stream at the destination output port.

20 Claims, 4 Drawing Sheets

U.S. PATENT DOCUMENTS

| | | | |
|---|---|---|---|
| 2004/0105456 A1* | 6/2004 | Lanzone et al. | 370/429 |
| 2004/0151500 A1* | 8/2004 | Misawa et al. | 398/58 |
| 2005/0286521 A1* | 12/2005 | Chiang et al. | 370/389 |
| 2006/0195631 A1* | 8/2006 | Rajamani | 710/51 |
| 2007/0189336 A1* | 8/2007 | Zou | 370/505 |
| 2008/0131117 A1* | 6/2008 | Cho et al. | 398/45 |
| 2009/0169204 A1* | 7/2009 | Meagher et al. | 398/43 |
| 2009/0220229 A1* | 9/2009 | Markus et al. | 398/50 |

* cited by examiner

TRANSPARENT SWITCHING FABRIC FOR MULTI-GIGABIT TRANSPORT

CROSS-REFERENCE TO RELATED APPLICATIONS

This application claims the benefit of U.S. Provisional Patent Application 61/068,117, filed Mar. 3, 2008, whose disclosure is incorporated herein by reference.

FIELD OF THE INVENTION

The present invention relates generally to communication systems, and particularly to methods and systems for switching communication signals.

BACKGROUND OF THE INVENTION

Optical communication networks are widely used for providing various types of communication services to clients. The part of the network that is directly connected to the clients is often referred to as an access network. The part of the network that carries traffic over larger distances is often referred to as a transport or backbone network. In many communication networks, access to clients is provided using protocols such as Gigabit Ethernet (GbE), 10 GbE, future 40 GbE and 100 GbE, Synchronous Optical Networking (SONET)/Synchronous Digital Hierarchy (SDH) and Fibre Channel (FC).

In some transport networks, multi-Gigabit traffic is transported using Optical Transport Network (OTN) protocols. The OTN technology is described by the International Telecommunication Union (ITU) in ITU-T Recommendation G.709/Y.1331, entitled "Interfaces for the Optical Transport Network (OTN)," March, 2003, which is incorporated herein by reference, as well as in subsequent amendments and drafts of this recommendation.

The ITU-T G.709/Y.1331 recommendation and its subsequent drafts define Optical channel Data Units (ODUs) of different classes, each characterized by a certain data rate. For example, ODU classes denoted ODU0, ODU1, ODU2/2e/1e, ODU3 and ODU4 are specified to carry traffic at 1 Gbps, 2.5 Gbps, 10 Gbps, 40 Gbps and 100 Gbps rates, respectively. ODUs are mapped to Optical channel Transport Units (OTUs), which are then sent over the transport network. Each OTU may carry a single ODU or multiple ODUs.

SUMMARY OF THE INVENTION

An embodiment of the present invention provides a communication apparatus, including:
at least one input port and multiple output ports;
at least one Serial-to-Parallel (S/P) converter, which is operative to receive from the input port an input data stream that is to be cross-connected to a destination output port, and to separate the input data stream into multiple sub-streams;
a plurality of parallel switching planes, each including:
at least one input for receiving a respective sub-stream from the at least one S/P converter;
multiple outputs, each output associated with a respective one of the output ports; and
switching circuitry, which is configured to switch the respective sub-stream to the output that is associated with the destination output port; and
at least one Parallel-to-Serial (P/S) converter, which is coupled to the outputs of the switching planes so as to combine the multiple sub-streams switched by the switching circuitry into a combined output data stream at the destination output port.

In some embodiments, the input and output data streams include Optical channel Data Units (ODUs) conforming to an Optical Transport Network (OTN) protocol. In a disclosed embodiment, the input data stream has a first bit rate, and the switching planes operate at second bit rates, which are lower than the first bit rate. In another embodiment, the S/P converter is operative to extract a clock signal from the input data stream, one of the switching planes is configured to cross-connect the extracted clock signal to the output that is associated with the destination output port, and the P/S converter is operative to combine the multiple sub-streams using the cross-connected clock signal. The P/S converter may be operative to re-sample the multiple sub-streams using the cross-connected clock signal, and to multiplex the re-sampled sub-streams so as to produce the output data stream.

In an embodiment, the S/P converter is operative to extract control information from the input data stream, the switching planes are configured to cross-connect the extracted control information to the output that is associated with the destination output port, and the P/S converter is operative to provide the control information in the output data stream. In another embodiment, the control information includes at least one information type selected from a group of types consisting of framing information and synchronization information of the input data stream, and the P/S converter is operative to produce the output data stream based on the control information.

There is additionally provided, in accordance with an embodiment of the present invention, a method for communication, including:
receiving from an input port an input data stream that is to be cross-connected to a destination output port selected from multiple output ports;
separating the input data stream into multiple sub-streams;
providing the multiple sub-streams to respective parallel switching planes, each including multiple outputs that are associated with the respective output ports;
switching each sub-stream using a respective switching plane to the output of the switching plane that is associated with the destination output port; and
combining the multiple sub-streams switched by the switching planes into a combined output data stream at the destination output port.

There is also provided, in accordance with an embodiment of the present invention, a communication apparatus, including:
a client-side module, which is operative to receive input data from client signals and to convert the input data into an input data stream;
a switching fabric, including:
at least one input port and multiple output ports;
at least one Serial-to-Parallel (S/P) converter, which is operative to receive from the input port the input data stream that is to be cross-connected to a destination output port, and to separate the input data stream into multiple sub-streams;
a plurality of parallel switching planes, each including:
at least one input for receiving a respective sub-stream from the at least one S/P converter;
multiple outputs, each output associated with a respective one of the output ports; and
switching circuitry, which is configured to switch the respective sub-stream to the output that is associated with the destination output port; and at least one Parallel-to-Serial (P/S) converter, which is coupled to the outputs of the switching planes so as to combine the multiple sub-streams switched by the switching circuitry into a combined output data stream at the destination output port; and a network-side module, which is operative to convert the output data stream into data frames, and to transmit the data frames over a transport network.

In some embodiments, the input and output data streams include Optical channel Data Units (ODUs) conforming to an Optical Transport Network (OTN) protocol, and the data frames include Optical channel Transport Units (OTUs) conforming to the OTN protocol. In some embodiments, the input data includes packets conforming to a Gigabit Ethernet (GbE) protocol, Fibre Channel (FC) packets, Synchronous Optical Networking—Synchronous Digital Hierarchy (SONET/SDH) signals and/or Optical Transport Network (OTN) signals. In a disclosed embodiment, the network-side module is operative to encode the data frames using a Forward Error Correction (FEC) code. The FEC may include an Enhanced FEC (EFEC).

The present invention will be more fully understood from the following detailed description of the embodiments thereof, taken together with the drawings in which:

DETAILED DESCRIPTION OF EMBODIMENTS

Overview

Various types of communication equipment use configurable switching fabrics for switching and forwarding data packets or other kinds of data streams between ports. In high-speed applications such as Constant Bit-Rate multi-Gigabit Transport, the implementation of switching fabrics using known techniques becomes complicated.

Embodiments of the present invention provide improved switching fabric configurations, which enable switching of variable-rate, high-speed traffic. In some embodiments, a Transparent Switching Fabric (TSF) comprises multiple switching circuits (referred to as switching planes) that operate in parallel. An input data stream, which is to be cross-connected to a certain destination output port, is separated into multiple sub-streams. The multiple sub-streams are cross-connected (switched) to the destination output port in parallel by the respective multiple switching planes. At the destination output port, the multiple sub-streams are recombined to produce an output data stream. Since the switching planes operate at only a fraction of the data rate of the input data stream, the disclosed TSF configurations are particularly suitable for switching variable-rate, high-speed data streams such as multi-Gigabit Ethernet, SONET/SDH, OTN, FC, as well as various other types of traffic.

In some embodiments, a clock signal is extracted from the input data stream. The extracted clock signal is cross-connected to the destination output port using a separate switching plane. At the destination output port, the multiple sub-streams are re-sampled using this clock signal before they are combined to form the output data stream. When using this technique, the resulting output data stream retains the timing characteristics of the input data stream, and the separation into multiple sub-streams for purposes of the switching operation is substantially transparent. In some embodiments, certain control information is extracted from the input data stream and cross-connected to the destination output port using a separate switching plane.

Several applications of the disclosed switching fabrics, such as a communication transport processor for connecting client signals to a transport network using OTN protocols, are described herein. Several alternative implementations of switching planes are also described.

In summary, the switching fabric configurations described herein provide transparent switching of variable-rate, high-speed data streams, as well as other traffic types. Unlike some known switching techniques, which implement mechanisms such as Time-Division Multiplex (TDM) column switching or packet/cell-based switching and therefore employ large and complex hardware, the disclosed switching fabric configurations exhibit reduced cost, size, power consumption, heat dissipation and processing delay of the cross-connected signals.

System Description

Figure 1:
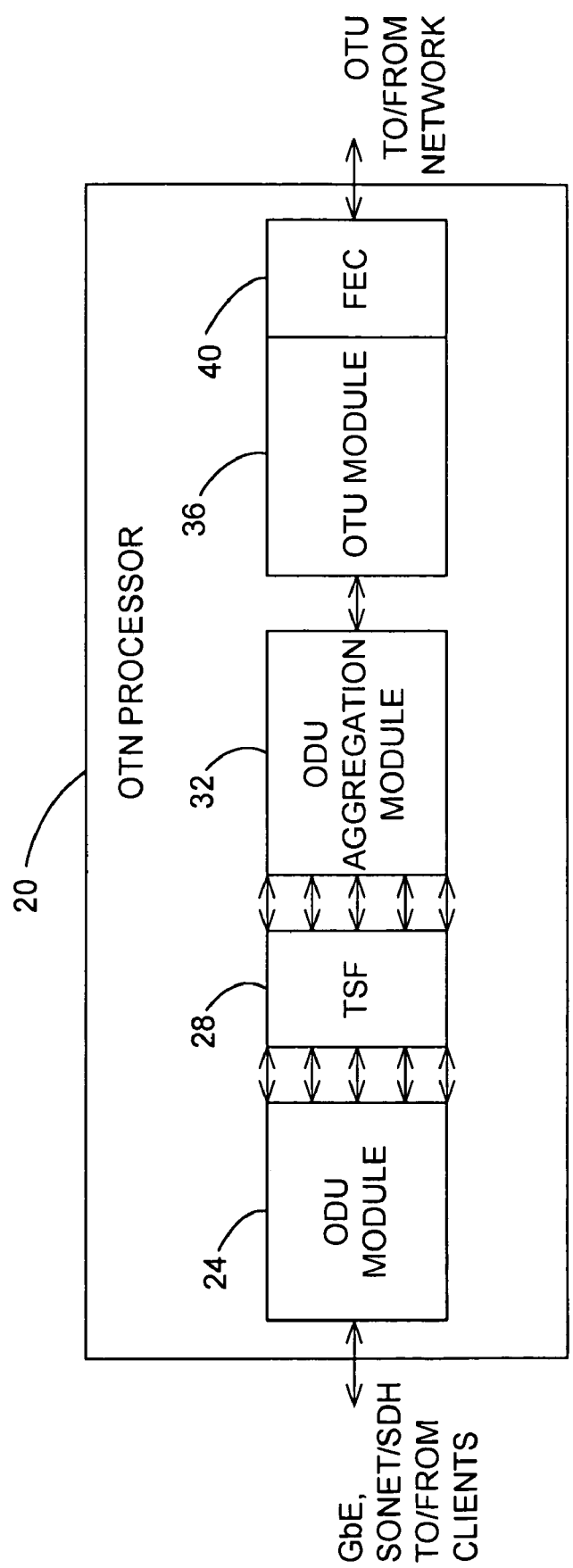
FIG. 1 is a block diagram that schematically illustrates a communication transport processor that includes a transparent switching fabric, in accordance with an embodiment of the present invention.

FIG. 1 is a block diagram that schematically illustrates a communication transport processor 20, in accordance with an embodiment of the present invention. Processor 20 connects client signals to a transport network using OTN protocols, and is thus referred to herein as an OTN processor. The OTN processor exchanges traffic with the clients at one end, and exchanges OTN OTUs with the transport network at the other end. By communicating with the transport network using OTN processor 20, the client signals may support any desired communication service, such as voice communication, video communication, Internet access, mobile communication services or any other suitable service type. The client signals may originate from any suitable computing or communication platform.

In the direction from the client signals to the transport network, processor 20 receives traffic from one or more clients using various protocols, such as, for example, GbE, 10 GbE, future 40 GbE or 100 GbE protocols, which are referred to herein collectively as "GbE protocols." Additionally or alternatively, the client traffic may comprise, for example, SONET/SDH traffic, OTN traffic or FC traffic. Although the embodiments described herein mainly address client traffic that conforms to different GbE protocols, processor 20 may support any other suitable format of client traffic.

The client traffic received by processor 20 is provided to an ODU module 24, which maps the client traffic to ODUs, in accordance with the OTN protocol. Typically, ODU module 24 encapsulates the received client signals in ODU frames, and adds the appropriate ODU elements defined in the OTN protocol. ODU module 24 may produce any suitable class of ODUs, such as ODU0, ODU1, ODU2, ODU2e, ODU1e, ODU3 or ODU4.

ODU module 24 provides the ODUs over multiple ports to a Transparent Switching Fabric (TSF) 28. The functions of TSF 28, as well as several example TSF configurations, are addressed in detail further below. TSF 28 comprises multiple input ports and multiple output ports, and is configured to switch each input signal (input data stream) applied to one of the input ports to one of its output ports. Generally, a given TSF input port may process ODUs of different classes.

The ODUs provided over the output ports of the TSF are processed by an ODU aggregation module 32. Typically, module 32 aggregates multiple ODUs into ODUs of a higher class (e.g., several ODU0s into an ODU2, several ODU0s and ODU1s into an ODU3, or any other suitable aggregation). Module 32 does not necessarily aggregate every ODU. In other words, module 32 may transfer some ODUs directly to its output without aggregating them with other ODUs.

The higher-class ODUs produced by module 32 are provided to an OTU module 36, which adds the OTU overhead, thus generating a respective OTU from each corresponding ODU in accordance with the OTN protocol. Module 36 comprises a Forward Error Correction (FEC) or Enhanced FEC (EFEC) module 40, which encodes the outgoing optical network signal using a suitable FEC or EFEC. The OTUs are then sent over the transport network, typically over an optical fiber.

In the opposite direction, i.e., from the transport network to the clients, each element of processor 20 typically carries out the opposite function. OTU module 36 receives OTUs from the network, decodes their FEC or EFEC using module 40, and extracts the ODUs from the respective OTUs. Module 32 de-multiplexes higher-class ODUs down to their tributary lower class ODUs. The ODUs are switched by TSF 28 to the appropriate ports. ODU module 24 extracts the client signals traffic from the ODUs provided by TSF 28, and the client signals are then sent to the client ports.

In some embodiments, OTN processor 20 may be implemented in a single Application Specific Integrated Circuit (ASIC). Alternatively, however, processor 20 may be implemented using multiple ASICS and/or using other suitable hardware elements, such as Field-Programmable Gate Arrays (FPGAs) or discrete components.

The different elements of processor 20, and in particular TSF 28, can be designed to support various data rates and numbers of input and/or output ports. In an example configuration, TSF 28 may comprise 96 input ports and 96 output ports on the network side, and another 96 input ports and 96 output ports on the client side. This sort of TSF may carry, for example, ninety-six ODU0s, forty-eight ODU1s, twelve ODU2/2e/1e's, three ODU3 or a single ODU4, or suitable combinations of different ODU classes, from each direction. In alternative embodiments, the TSF may support any desired number of input and output ports on its network side and on its client side. Each TSF input or output port, as well as internal paths within the TSF, may be designed to carry different bit rates. The TSF need not necessarily be symmetric, i.e., it may carry different bit rates or have different numbers of ports in the two directions.

Transparent Switching Fabric (TSF) Configuration

As noted above, TSF 28 comprises multiple input ports and multiple output ports on both the network side and the client side. The TSF receives input signals (input data streams) over the input ports, and switches each input signal to a certain destination output port. As will be shown below, the TSF configurations described herein enable the TSF to switch variable-rate, high-speed signals while operating at a relatively low internal bit rate. Moreover, the TSF configurations described herein switch the data streams in a transparent manner, meaning that each data stream is reproduced at the desired output port with high fidelity and small delay, and maintains its original timing and clock characteristics.

Figure 2:
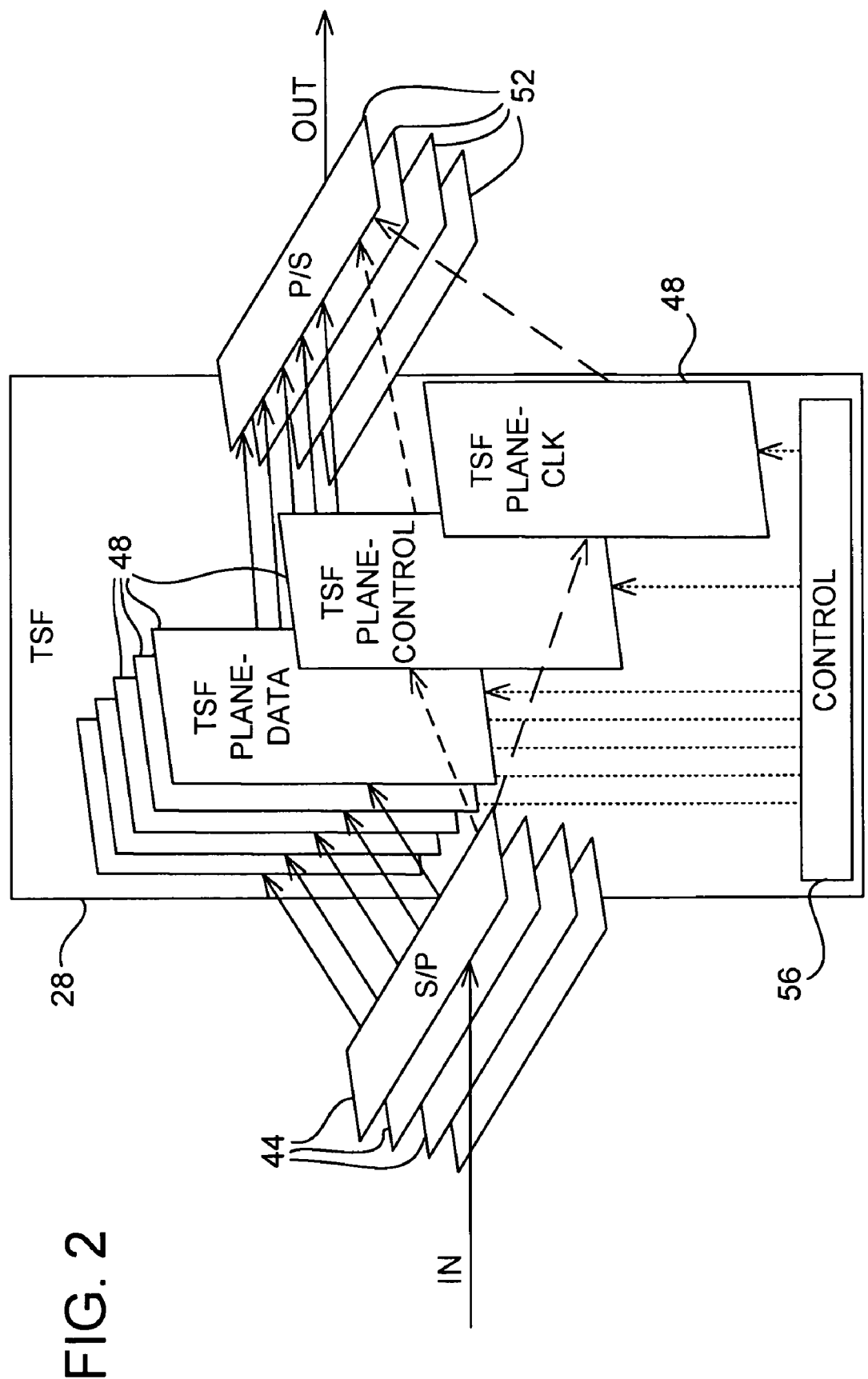
FIG. 2 is a block diagram that schematically illustrates a transparent switching fabric, in accordance with an embodiment of the present invention.

FIG. 2 is a block diagram that schematically illustrates TSF 28, in accordance with an embodiment of the present invention. For the sake of conceptual clarity, FIG. 2 illustrates the switching of a single input data stream from a given input port to a given destination output port of the TSF. Generally, however, TSF 28 switches multiple input data streams simultaneously, as will be described below.

Figure 4:
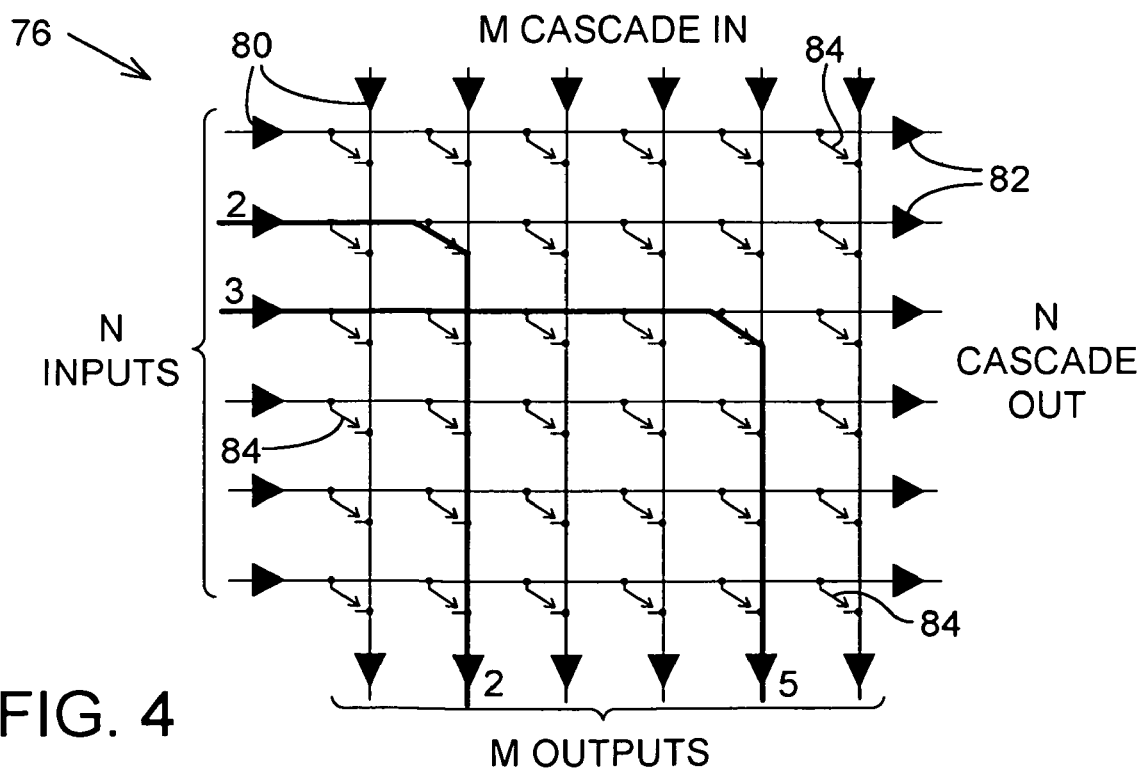
FIG. 4 is a block diagram that schematically illustrates a switching plane in a transparent switching fabric, in accordance with an embodiment of the present invention.
Figure 5:
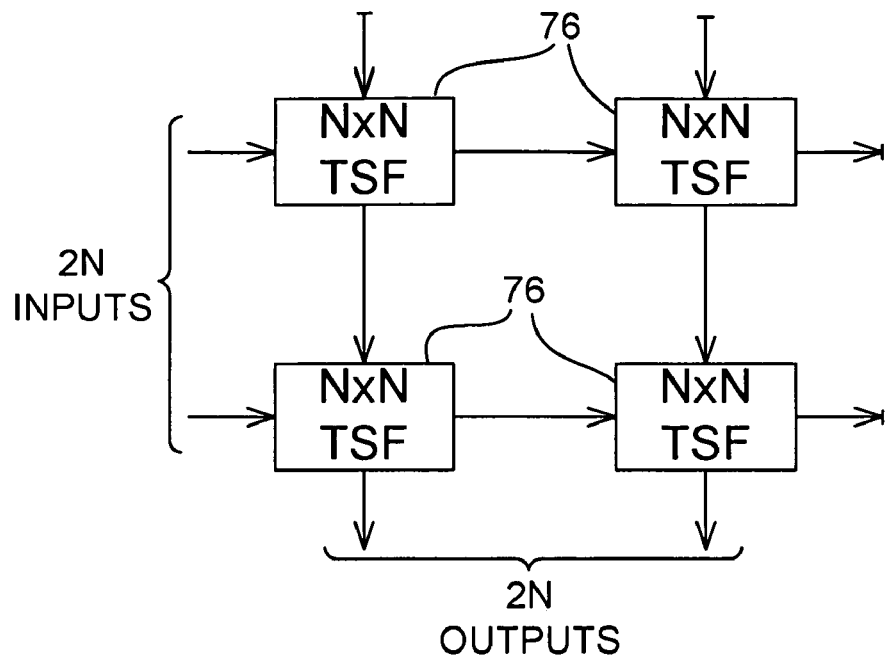
FIG. 5 is a block diagram that schematically illustrates cascaded switching planes, in accordance with an embodiment of the present invention.
Figure 6:
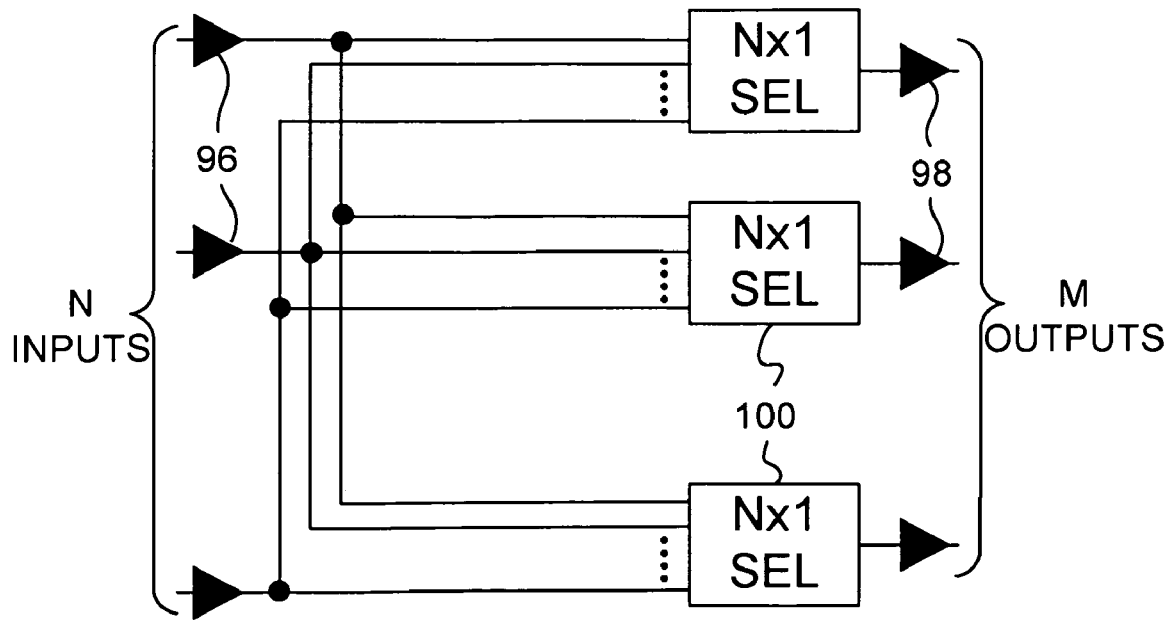
FIG. 6 is a block diagram that schematically illustrates a switching plane in a transparent switching fabric, in accordance with an alternative embodiment of the present invention.

In the example of FIG. 2, the input data stream is processed by a Serial-to-Parallel (S/P) converter 44, which de-multiplexes or otherwise separates the stream into multiple, lower-rate sub-streams. For example, a 1 Gbps input data stream can be separated into five 200 Mbps sub-streams. The multiple sub-streams are switched in parallel by a corresponding set of multiple switching circuits 48, referred to herein as switching planes. Each switching plane has multiple inputs and multiple outputs. The outputs of each switching plane are associated with the output ports of the TSF, respectively. A given switching plane is configured to switch each sub-stream applied to one of its inputs to one of its outputs. As can be appreciated, switching planes 48 operate at the lower bit rate of the individual sub-streams. Several example implementations of switching planes 48 are shown in FIGS. 4-6 below.

The outputs of switching planes 48, which are assigned to switch the sub-streams of the input data stream in question, are connected to a Parallel-to-Serial (P/S) converter 52. The P/S converter multiplexes the multiple sub-streams, and produces a serial output data stream that closely resembles the input data stream. The output data stream is sent over the destination output port of the TSF.

Typically, the paths traversed by the different sub-streams are designed to have matching propagation delays, so that the different sub-streams arrive at the P/S converter at the correct timing.

In some embodiments, S/P converter 44 extracts the clock signal (e.g., parallel bus clock) from the input data stream, and a separate switching plane 48 cross-connects the clock signal toward the destination output port. Thus, the clock signal extracted from a given input data stream is provided to the same P/S converter that multiplexes the sub-streams of this input stream. The P/S converter typically re-samples the sub-streams using this clock signal, and multiplexes the re-sampled sub-streams. As a result, the output data stream reproduces the timing and clock characteristics of the input data stream with high accuracy.

In some embodiments, S/P converter 44 extracts control information from the input data stream. The control information is handled as one or more additional sub-streams, and is switched by additional switching planes 48 so as to cross-connect these sub-streams to the destination output port. The switched control sub-streams are provided to the same P/S converter 52 that multiplexes the data sub-streams of this input stream, and the P/S converter presents the control information in the output data stream. For example, the control information may carry input framing and/or synchronization information, which is used for properly reconstructing the output data stream. In this example, the P/S converter reconstructs the output data stream using this control information.

Typically, the switching planes used for switching clock signals and control information are similar to the switching planes that are used for switching data sub-streams. The clock signal and the control information sub-streams may be viewed as additional sub-streams of the input data stream. In some embodiments, TSF 28 comprises a pool of switching planes 48, each of which can be assigned to switch data sub-streams, clock signals and/or control information, as desired.

In summary, a given input data stream is separated into multiple lower-speed sub-streams, which often have a variable rate. The sub-streams are switched in parallel by respective switching planes that operate at the lower speed of the individual sub-streams. The switched sub-streams are then multiplexed to form an output data stream that reproduces the input data stream with high accuracy. The output data stream is output at the desired output port of the TSF.

In some embodiments, the S/P converters, switching planes and P/S converters are all integrated in a single IC. In alternative embodiments, the S/P and/or P/S converters may be located separately from the switching planes, such as in line cards of a transmission system.

The description above focuses on a single input data stream. Typically, however, TSF 28 comprises multiple S/P and P/S converters, and switches multiple input data streams concurrently. Each input data stream is received at a certain input port and is de-multiplexed by a S/P converter that is coupled to this input port. A set of switching planes is assigned to switch the sub-streams produced from each input data stream. The switched sub-streams of each input data stream are provided to a P/S converter that is coupled to the output port to which the data stream is to be cross-connected. Typically, each switching plane 48 is able to switch multiple sub-streams (belonging to different input data streams) simultaneously.

In some embodiments, TSF 28 comprises a control unit 56, which configures and controls the different TSF elements. In particular, control unit 56 may assign switching paths within each of the multiple parallel switching planes to input data streams (including data sub-streams, clock signals and/or control information sub-streams), configure the switching planes to switch certain inputs to certain outputs (i.e., to switch each sub-stream to a desired output), and/or perform various other control functions.

Switching planes 48 can be designed to operate at any desired bit rate. In a typical implementation, the bit rate of the switching planes is on the order of 200-300 Mbps, although any other suitable value can also be used. Different switching planes may operate at different rates, and a given switching plane may be configurable to operate at different rates at different times. TSF 28 may comprise any suitable number of switching planes. In a particular implementation, TSF 28 may comprise twenty-six switching planes, with each plane supporting sixty simultaneous paths. Alternatively, any other suitable values can also be used.

Figure 3:
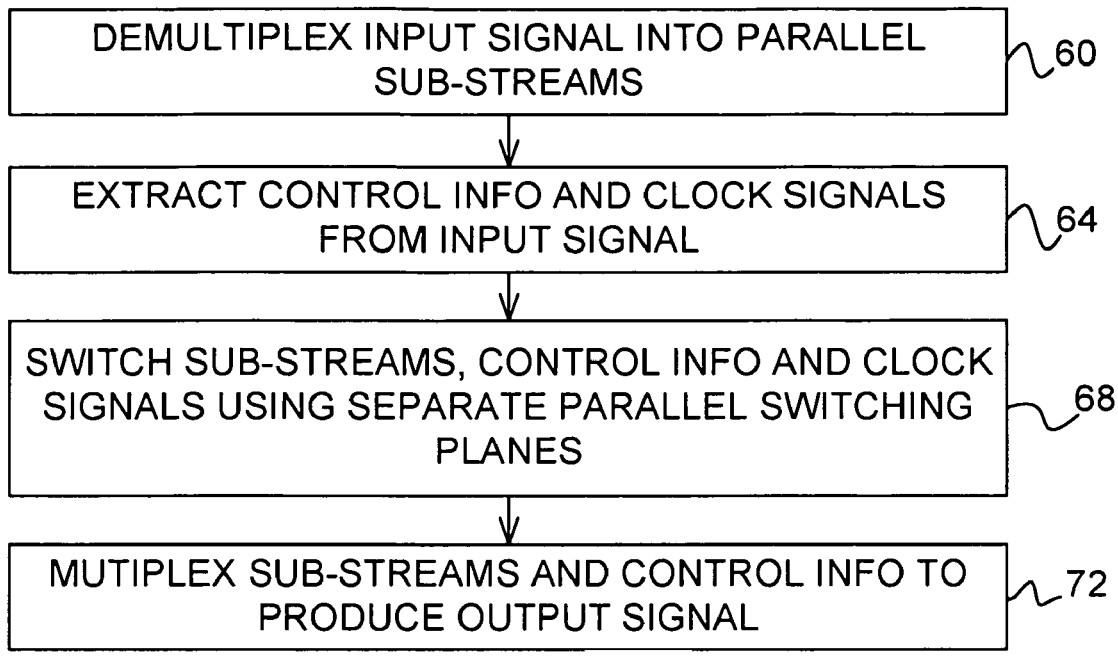
FIG. 3 is a flow chart that schematically illustrates a method for switching communication signals, in accordance with an embodiment of the present invention.

FIG. 3 is a flow chart that schematically illustrates a method for switching communication signals, in accordance with an embodiment of the present invention. The method begins with a certain input port of TSF 28 receiving a serial input data stream, e.g., an OTN ODU. The input data stream is to be cross-connected to a certain destination output port of the TSF, as set by control unit 56.

One of S/P converters 44, which is coupled to this input port, separates the input data stream into multiple sub-streams, at a de-multiplexing step 60. The S/P converter extracts the control information sub-streams and the clock signal from the input data stream, at an extraction step 64. The multiple sub-streams, the clock signal and the control information sub-streams (or any subset thereof) are switched in parallel by respective switching planes 48, at a parallel switching step 68. The switched sub-streams are combined (e.g., multiplexed) to produce an output data stream by one of P/S converters 52, which is coupled to the destination output port, at a multiplexing step 72. The P/S converter typically produces the output data stream by re-sampling the multiple sub-streams using the clock signal that was extracted at step 64 above and provided to the P/S converter via one of the switching planes. Thus, the output data stream retains the timing characteristics of the input data stream with high accuracy.

Example Switching Plane Implementations

Switching planes 48 can be implemented using any suitable switching method or topology. Various switching methods are known in the art, and any such method can be used. For example, switching planes 48 may comprise cross-point switching architectures, selector-based architectures, single- or multi-stage switching arrays, square switching architectures, Clos switching architectures, re-arrangeable Clos architectures, or any other suitable method. FIGS. 4-6 below describe several possible implementations, by way of example.

FIG. 4 is a block diagram that schematically illustrates a cross-point-based switching plane 76, in accordance with an embodiment of the present invention. Switching plane 76 can be used to implement switching planes 48 in FIG. 2 above. Switching plane 76 has N inputs and M outputs. The N inputs are also reproduced over N respective cascaded outputs. The M outputs are also driven by M respective cascaded inputs. The cascaded inputs and outputs are used for cascading multiple planes 76, in order to implement higher-capacity switching planes having larger numbers of inputs and/or outputs. Such a configuration is shown in FIG. 5 below. The inputs are buffered by input buffers 80, and the outputs are buffered by output buffers 82.

Plane 76 comprises multiple switches 84. The switches are controlled by control unit 56 of TSF 28. Each switch 84, when closed, connects a given input to a given output of plane 76. As such, control unit 56 is able to configure plane 76 to switch any input to any output by setting switches 84 appropriately. In the present example, an input denoted "2" is connected to an output denoted "2", and an input denoted "3" is connected to an output denoted "5".

FIG. 5 is a block diagram that schematically illustrates a high-capacity switching plane 88, which comprises multiple cascaded switching planes 76, in accordance with an embodiment of the present invention. In the present example, four N-by-N switching planes 76 are cascaded using their cascaded inputs and outputs to form a 2N-by-2N switching plane. In alternative embodiments, any desired number of switching planes of any desired size can be cascaded, in either one or two dimensions, to form a high-capacity switching plane.

FIG. 6 is a block diagram that schematically illustrates a selector-based switching plane 92, in accordance with an alternative embodiment of the present invention. Switching plane 92 can be used to implement switching planes 48 in FIG. 2 above. Switching plane 92 has N inputs and M outputs. The N inputs are buffered by respective input buffers 96, and the M outputs are buffered by respective output buffers 98. The switching plane comprises M selectors 100, which are controlled by control unit 56 of TSF 28. The output of each selector 100 is connected to a respective output of the switching plane. Each selector 100 has N inputs, which receive the respective N inputs of the switching plane. Thus, each selector can select one of the inputs and connect it to the respective output of the switching plane. Thus, by controlling selectors 100, control unit 56 is able to configure plane 92 to switch any input to any output.

The methods and systems described herein can be used in multi-Gigabit applications, Ethernet applications, SONET/SDH cross-connects, optical cross-connects (OXC), as well as in various other Time-Division Multiplexing (TDM) applications that involve switching fabrics.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication apparatus, comprising:
at least one input port and multiple output ports;
at least one Serial-to-Parallel (S/P) converter, which is operative to receive from the input port an input data stream that is to be cross-connected to a destination output port, to extract a clock signal from the input data stream and to separate the input data stream into multiple sub-streams;
a plurality of parallel switching planes, each comprising:
at least one input for receiving a respective sub-stream from the at least one S/P converter;
multiple outputs, each output associated with a respective one of the multiple output ports; and
switching circuitry, which is configured to switch the respective sub-stream to the output that is associated with the destination output port,
wherein one of the switching planes is configured to cross-connect the extracted clock signal to the output that is associated with the destination output port; and
at least one Parallel-to-Serial (P/S) converter, which is coupled to the outputs of the switching planes so as to combine, using the cross-connected clock signal, the multiple sub-streams switched by the switching circuitry into a combined output data stream at the destination output port.

2. The apparatus according to claim 1, wherein the input and output data streams comprise Optical channel Data Units (ODUs) conforming to an Optical Transport Network (OTN) protocol.

3. The apparatus according to claim 1, wherein the input data stream has a first bit rate, and wherein the switching planes operate at second bit rates, which are lower than the first bit rate.

4. The apparatus according to claim 1, wherein the P/S converter is operative to re-sample the multiple sub-streams using the cross-connected clock signal, and to multiplex the re-sampled sub-streams so as to produce the output data stream.

5. The apparatus according to claim 1, wherein the S/P converter is operative to extract control information from the input data stream, wherein the switching planes are configured to cross-connect the extracted control information to the output that is associated with the destination output port, and wherein the P/S converter is operative to provide the control information in the output data stream.

6. The apparatus according to claim 5, wherein the control information comprises at least one information type selected from a group of types consisting of framing information and synchronization information of the input data stream, and wherein the P/S converter is operative to produce the output data stream based on the control information.

7. A method for communication, comprising:
receiving from an input port an input data stream that is to be cross-connected to a destination output port selected from multiple output ports;
extracting a clock signal from the input data stream, and separating the input data stream into multiple sub-streams;
providing the multiple sub-streams to respective parallel switching planes, each including multiple outputs that are associated with the respective output ports;
switching each sub-stream using a respective switching plane to the output of the switching plane that is associated with the destination output port, including cross-connecting the extracted clock signal using a dedicated switching plane to the output of the dedicated switching plane that is associated with the destination output port; and
combining, using the cross-connected clock signal, the multiple sub-streams switched by the switching planes into a combined output data stream at the destination output port.

8. The method according to claim 7, wherein the input and output data streams comprise Optical channel Data Units (ODUs) conforming to an Optical Transport Network (OTN) protocol.

9. The method according to claim 7, wherein the input data stream has a first bit rate, and wherein switching each sub-stream comprises operating the switching planes at second bit rates, which are lower than the first bit rate.

10. The method according to claim 7, wherein combining the multiple sub-streams comprises re-sampling the sub-streams using the cross-connected clock signal, and multiplexing the re-sampled sub-streams so as to produce the output data stream.

11. The method according to claim 7, wherein separating the input data stream comprises extracting control information from the input data stream, wherein switching each sub-stream comprises cross-connecting the extracted control information by a given switching plane to the output of the given switching plane that is associated with the destination output port, and wherein combining the multiple sub-streams comprises providing the control information in the output data stream.

12. The method according to claim 11, wherein the control information comprises at least one information type selected from a group of types consisting of framing information and synchronization information of the input data stream, and wherein combining the multiple sub-streams comprises producing the output data stream based on the control information.

13. A communication apparatus, comprising:
a client-side module, which is operative to receive input data from client signals and to convert the input data into an input data stream;
a switching fabric, comprising:
at least one input port and multiple output ports;
at least one Serial-to-Parallel (S/P) converter, which is operative to receive from the input port the input data stream that is to be cross-connected to a destination output port, to extract a clock signal from the input data stream and to separate the input data stream into multiple sub-streams;

a plurality of parallel switching planes, each comprising:
at least one input for receiving a respective sub-stream from the at least one S/P converter;
multiple outputs, each output associated with a respective one of the multiple output ports; and
switching circuitry, which is configured to switch the respective sub-stream to the output that is associated with the destination output port,
wherein one of the switching planes is configured to cross-connect the extracted clock signal to the output that is associated with the destination output port; and at least one Parallel-to-Serial (P/S) converter, which is coupled to the outputs of the switching planes so as to combine, using the cross-connected clock signal, the multiple sub-streams switched by the switching circuitry into a combined output data stream at the destination output port; and a network-side module, which is operative to convert the output data stream into data frames, and to transmit the data frames over a transport network.

14. The apparatus according to claim 13, wherein the input and output data streams comprise Optical channel Data Units (ODUs) conforming to an Optical Transport Network (OTN) protocol, and wherein the data frames comprise Optical channel Transport Units (OTUs) conforming to the OTN protocol.

15. The apparatus according to claim 13, wherein the input data comprises packets conforming to a Gigabit Ethernet (GbE) protocol.

16. The apparatus according to claim 13, wherein the input data comprises Fibre Channel (FC) packets.

17. The apparatus according to claim 13, wherein the input data comprises Synchronous Optical Networking—Synchronous Digital Hierarchy (SONET/SDH) signals.

18. The apparatus according to claim 13, wherein the input data comprises Optical Transport Network (OTN) signals.

19. The apparatus according to claim 13, wherein the network-side module is operative to encode the data frames using a Forward Error Correction (FEC) code.

20. The apparatus according to claim 19, wherein the FEC comprises an Enhanced FEC (EFEC).

\* \* \* \* \*